United States Patent
Micks et al.

(10) Patent No.: US 10,635,912 B2
(45) Date of Patent: Apr. 28, 2020

(54) VIRTUAL SENSOR DATA GENERATION FOR WHEEL STOP DETECTION

(71) Applicant: Ford Global Technologies, LLC., Dearborn, MI (US)

(72) Inventors: Ashley Elizabeth Micks, Mountain View, CA (US); Venkatapathi Raju Nallapa, Fairfield, CA (US); Harpreetsingh Banvait, Sunnyvale, CA (US); Scott Vincent Myers, Camarillo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/627,108

(22) Filed: Jun. 19, 2017

(65) Prior Publication Data

US 2017/0293816 A1    Oct. 12, 2017

Related U.S. Application Data

(63) Continuation of application No. 14/975,177, filed on Dec. 18, 2015, now Pat. No. 9,740,944.

(51) Int. Cl.
*G05D 1/00* (2006.01)
*G06K 9/00* (2006.01)
(Continued)

(52) U.S. Cl.
CPC ..... *G06K 9/00805* (2013.01); *G06K 9/00812* (2013.01); *G06K 9/209* (2013.01);
(Continued)

(58) Field of Classification Search
CPC .................................................. G05D 1/0088
See application file for complete search history.

(56) References Cited

U.S. PATENT DOCUMENTS 6,236,908 B1 *  5/2001  Cheng ................. F02D 41/0062
                                                        701/1
8,190,295 B1 *  5/2012  Garretson ............ G05D 1/0038
                                                        700/245
(Continued)

OTHER PUBLICATIONS

Chen et al., "DeepDriving: Learning Affordance for Direct Perception in Autonomous Driving", Dec. 7-13, 2015, ICCV '15 Proceedings of the 2015 IEEE International Conference on Computer Vision, pp. 2722-2730 (Year: 2015).*

*Primary Examiner* — Phong X Nguyen
(74) *Attorney, Agent, or Firm* — David R. Stevens; Stevens Law Group

(57) ABSTRACT

The disclosure relates to methods, systems, and apparatuses for virtual sensor data generation and more particularly relates to generation of virtual sensor data for training and testing models or algorithms to detect objects or obstacles. A method for generating virtual sensor data includes simulating, using one or more processors, a three-dimensional (3D) environment comprising one or more virtual objects. The method includes generating, using one or more processors, virtual sensor data for a plurality of positions of one or more sensors within the 3D environment. The method includes determining, using one or more processors, virtual ground truth corresponding to each of the plurality of positions, wherein the ground truth comprises a dimension or parameter of the one or more virtual objects. The method includes storing and associating the virtual sensor data and the virtual ground truth using one or more processors.

20 Claims, 6 Drawing Sheets

(51) Int. Cl.
*G06T 7/246* (2017.01)
*G06K 9/62* (2006.01)
*G06T 17/05* (2011.01)
*G06K 9/20* (2006.01)
*G08G 1/16* (2006.01)

(52) U.S. Cl.
CPC ......... *G06K 9/6256* (2013.01); *G06K 9/6262* (2013.01); *G06T 7/251* (2017.01); *G06T 17/05* (2013.01); *B60W 2400/00* (2013.01); *B60W 2420/00* (2013.01); *G06T 2207/20081* (2013.01); *G06T 2207/30261* (2013.01); *G06T 2207/30264* (2013.01); *G08G 1/165* (2013.01); *G08G 1/168* (2013.01)

(56) References Cited

U.S. PATENT DOCUMENTS

| | | | | |
|---|---|---|---|---|
| 8,665,079 | B2* | 3/2014 | Pawlicki | B60Q 1/525 340/435 |
| 9,507,346 | B1* | 11/2016 | Levinson | G05D 1/0214 |
| 9,720,415 | B2* | 8/2017 | Levinson | G01S 13/86 |
| 2004/0193347 | A1* | 9/2004 | Harumoto | B60R 21/0132 701/45 |
| 2005/0187678 | A1* | 8/2005 | Myeong | G05D 1/0255 701/27 |
| 2008/0097942 | A1* | 4/2008 | Zhao | G06K 9/6229 706/13 |
| 2010/0299332 | A1* | 11/2010 | Dassas | G06F 17/245 707/741 |
| 2011/0150337 | A1* | 6/2011 | Lai | G06K 9/00234 382/190 |
| 2012/0027288 | A1* | 2/2012 | Yuan | G06K 9/6211 382/152 |
| 2012/0083923 | A1* | 4/2012 | Matsumoto | B25J 9/1664 700/255 |
| 2013/0253767 | A1 | 9/2013 | Lee | |
| 2014/0140590 | A1* | 5/2014 | Wilson | G06K 9/00362 382/128 |
| 2015/0149031 | A1* | 5/2015 | Pfister | G01M 17/007 701/33.4 |
| 2015/0363940 | A1* | 12/2015 | Held | G06T 7/277 382/107 |
| 2016/0163058 | A1* | 6/2016 | Wei | G06K 9/3233 382/171 |
| 2016/0286351 | A1* | 9/2016 | Glenn, III | H04W 4/023 |
| 2016/0314224 | A1* | 10/2016 | Wei | G06F 17/5009 |
| 2017/0132527 | A1* | 5/2017 | Ahn | G06F 17/5009 |
| 2017/0169620 | A1* | 6/2017 | Bleiweiss | G06F 17/50 |
| 2017/0243083 | A1* | 8/2017 | Wang | G06K 9/00711 |

* cited by examiner

VIRTUAL SENSOR DATA GENERATION FOR WHEEL STOP DETECTION

CROSS-REFERENCE TO RELATED APPLICATIONS

This application is a continuation of and claims the benefit of and priority to U.S. patent application Ser. No. 14/975,177, entitled "Virtual Sensor Data Generation For Wheel Stop Detection", filed Dec. 18, 2015 by Ashley Elizabeth Micks et al., the entire contents of which are expressly incorporated by reference.

TECHNICAL FIELD

The disclosure relates generally to methods, systems, and apparatuses for virtual sensor data generation and more particularly relates to generation of virtual sensor data for training and testing models or algorithms to detect objects or obstacles, such as wheel stops or parking barriers.

BACKGROUND

Automobiles provide a significant portion of transportation for commercial, government, and private entities. Due to the high value of automobiles and potential harm to passengers and drivers, driver safety and avoidance of accidents or collisions with other vehicles or objects are extremely important.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
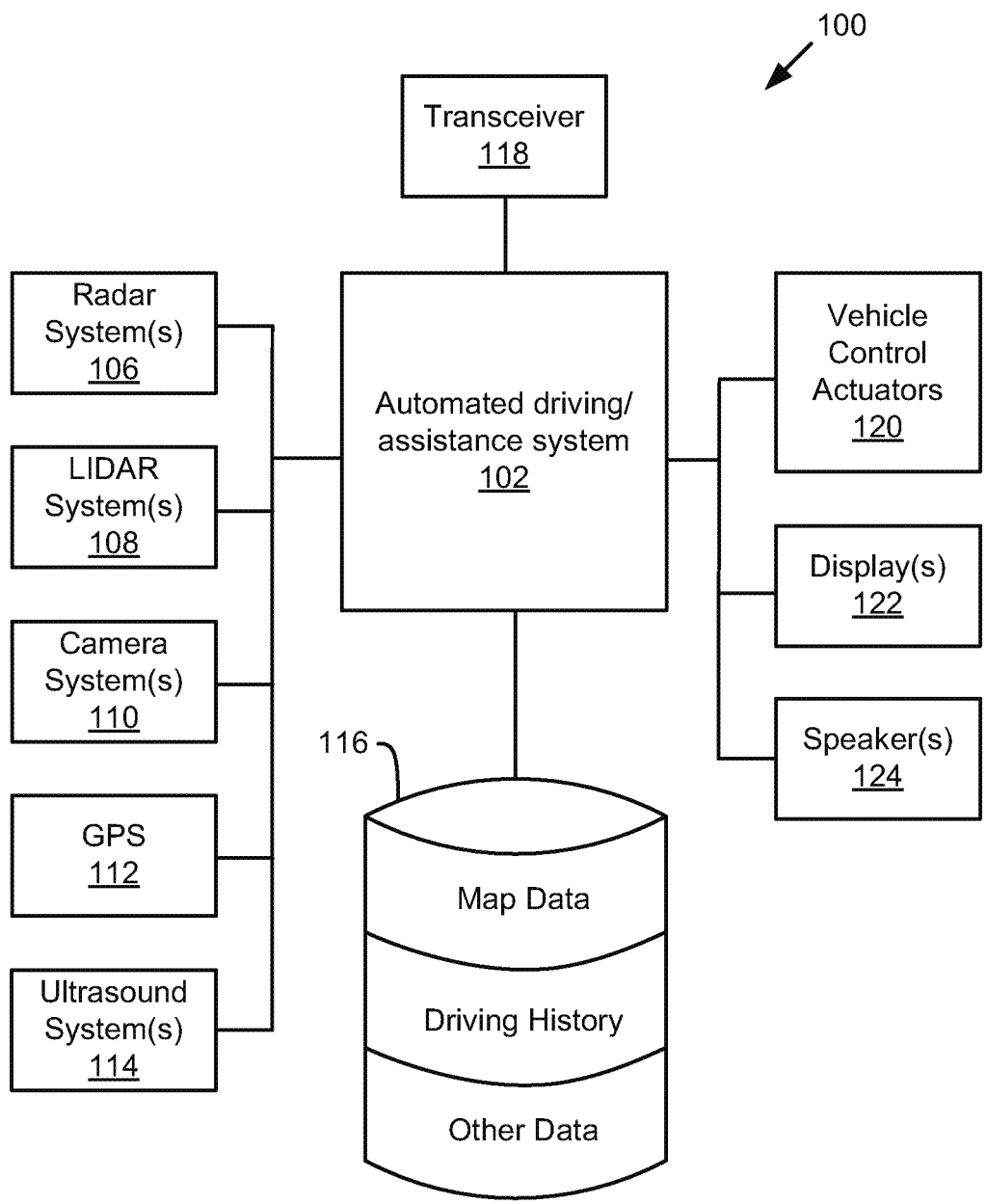
FIG. 1 is a schematic block diagram illustrating an implementation of a vehicle control system that includes an automated driving/assistance system.

A very common location for collisions or accidents for vehicles occurs during parking or leaving a parking location. Because of the close range of other vehicles, pedestrians, or other objects, there tends to be a small margin for error if damage to vehicles, including scrapes to bumpers or side panels, is to be avoided. In many parking lots, or at other parking locations, parking stalls are marked or bounded on at least one side by some sort of parking barrier, such as a parking chock, curb, or the like. The parking barriers may be used to keep vehicles from rolling too far forward (or backward) into another row of vehicles and may stop a vehicle from moving too far when the wheels encounter the barrier. A parking barrier may include, or be referred to herein as, a parking barrier, a parking chock, a parking wheel stopper, a curb, or the like.

When a car is parked in a parking lot, it may come across a wheel stop or other parking barrier. Applicants have recognized that the sizes and heights of wheel stops can vary significantly. In some situations, a driver, automated driving system, or automated assistance system is not able to detect the wheel stop, and the vehicle may run over it and damage the front or rear bumper or fascia. In order to avoid such a collision, both the position and the height of the wheel stop must be known so that bumping into or scraping the bottom of the car can be avoided.

However, Applicants have recognized that if wheel stops or parking barriers are to be detected by onboard perception, so that a warning can be provided to the driver, the automated driving system, or the automated assistance system or so that autonomous braking can be initiated as needed, the detection algorithms will need to be trained and tested on large amounts of diverse data. However, real world sensor data takes considerable time and resources to acquire, by setting up physical tests or driving around with sensors to collect data for relevant scenarios.

The present application discloses systems and methods for generation of synthetic or virtual sensor data and/or associated ground truth. In one embodiment, a method includes simulating a three-dimensional (3D) environment that includes one or more parking barriers. The method includes generating virtual sensor data for a plurality of positions of one or more sensors within the 3D environment. The method further includes determining virtual ground truth corresponding to each of the plurality of positions, wherein the ground truth includes a height of the at least one of the parking barriers. The method further includes storing and associating the virtual sensor data and the virtual ground truth.

Some implementations integrate a virtual driving environment, created using 3D modeling and animation tools, with sensor models to produce virtual sensor data in large quantities in a short amount of time. Relevant parameters, such as lighting and positioning of the wheel stop, may be randomized in the recorded data to ensure a diverse dataset with minimal bias. In one implementation, a sensor is positioned relative to a roadway or parking lot (or other virtual driving environment) according to its planned positioning on a vehicle. The virtual sensor may be repositioned and/or moved along a virtual path in the virtual environment into locations where it can observe objects or obstacles, such as wheel stops.

During virtual movement or repositioning, the virtual sensor may periodically record data or generate virtual sensor data. For each time step of recorded data—each frame of camera data, for example—annotations are automatically provided to record ground truth information about the positions of all wheel stops within range of the sensor as well as the height of each wheel stop. In the case of camera data, ground truth data may include, for each frame of image data, a complimentary frame of pixel-wise segmented image data showing the same view. For example, all of the pixels of the wheel stop in the complementary frame may be a solid color with constant values (e.g., red-green-blue (RGB)) so that it is known exactly which pixels belong to the wheel stop. The ground truth information may be used to train a perception algorithm using supervised learning, or to test existing algorithms and quantify their performance. The embodiments may generate virtual sensor for a camera, a light ranging and detection (LIDAR) system, a radar system, an ultrasound system, and/or a different sensor system or sensor type.

The systems and methods disclosed herein may provide significant benefits over real-world data. For example, compared to real-world data, virtual data is cheaper in terms of time, money, and resources. Specifically, systems and methods disclosed herein may generate thousands of virtual images for a variety of conditions within a few minutes as opposed to hours or months acquiring a similar number of real-world images. The virtual sensor data with automatic annotations greatly improves ease in obtaining ground truth or other data useful for training and testing object detection or localization, such as for wheel stop detection algorithms.

Although some embodiments of the present disclosure discuss simulations and virtual data for detection, classification, and/or dimension determinations of parking barriers, these are given by way of example only. The present disclosure contemplates the use of the systems, methods, and devices disclosed herein for the detection, classification, localization, and dimension detection for any object or obstacle. For example, virtual representations of any object or obstacle that may be detected by a vehicle in a driving environment are contemplated herein.

Referring now to the figures, FIG. 1 illustrates an example vehicle control system 100 that may be used to automatically detect parking barriers. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to determine that a parking barrier or chock is present and may also determine a size, location, and/or dimensions of an object or obstacle, such as a parking barrier or chock.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultra sound systems 114. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle, such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway, or other location. For example, the automated driving/assistance system 102 may determine a path based on information or perception data provided by any of the components 106-118. The sensor systems/devices 106-110 and 114 may be used to obtain real-time sensor data so that the automated driving/ assistance system 102 can assist a driver or drive a vehicle in real-time. The automated driving/assistance system 102 may implement an algorithm or use a model, such as a deep neural network, to process the sensor data and identify a presence, location, height, and/or dimension of a parking barrier, object, or other obstacle. However, in order to train or test a model or algorithm, large amounts of sensor data may be needed.

Figure 2:
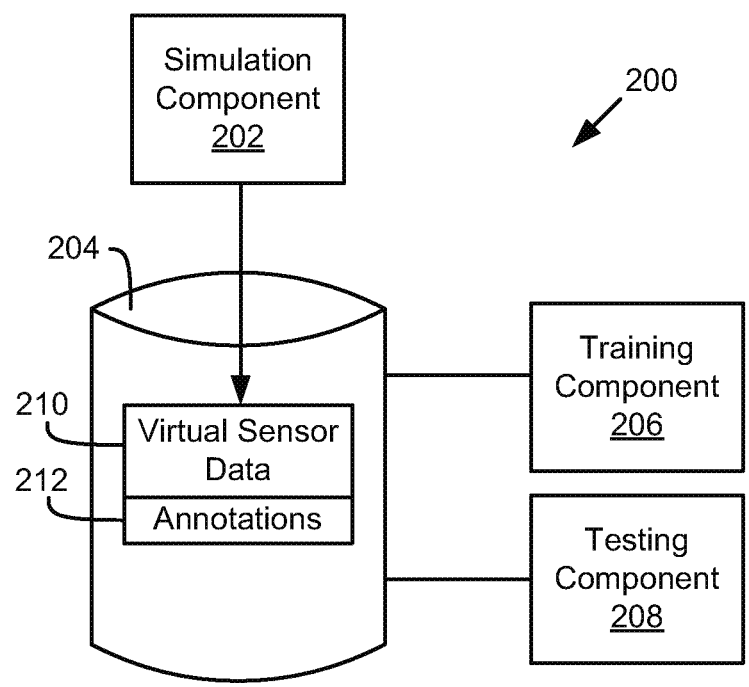
FIG. 2 is a schematic block diagram illustrating an implementation of a system for sensor data generation.

Referring now to FIG. 2, one embodiment of a system 200 for sensor data generation is shown. The system 200 includes a simulation component 202, storage 204, a training component 206, and a testing component 208. The simulation component 202 may be configured to simulate a driving environment and generate virtual sensor data 210 and virtual ground truth or other information as annotations 212 for the virtual sensor data 210. The annotations may include any type of ground truth, such as simulation conditions used by the simulation component 202 to generate the driving environment and/or virtual sensor data 210. For example, the virtual ground truth may include a virtual distance between a sensor and a virtual parking barrier, one or more dimensions of the virtual parking barrier (e.g., the height), or any other object or obstacle. Similarly, the virtual ground truth may include one or more details about lighting conditions, weather conditions, sensor position, sensor orientation, sensor velocity, and/or virtual sensor type (e.g., a specific model of sensor). The simulation component 202 may annotate frames or sets of virtual sensor data with the corresponding ground truth or store the virtual ground truth with an indication of the sensor data to which the virtual ground truth belongs.

The virtual sensor data 210 and/or any information for inclusion in annotations 212 may be stored in storage 204. Storage 204 may include long term storage such as a hard disk or machine storage such as random access memory (RAM). The virtual sensor data 210 and any associated annotations 212 may be stored as part of the same file or may be stored in separate files. The training component 206 and/or the testing component 208 may then access and use the virtual sensor data 201 and/or annotations 212 for training or testing a parking barrier detection algorithm or model.

The training component 206 is configured to train a machine learning algorithm using virtual sensor data and ground truth generated by the simulation component 202. For example, the training component 206 may train a machine learning algorithm or model by providing at least a portion of the virtual sensor data and corresponding virtual ground truth to train the machine learning algorithm or model to determine one or more of a height and a position of the one or more parking barriers, object, or other obstacle. The training component 206 may provide the virtual sensor data and virtual ground truth to a training algorithm for a neural network. For example, the training component 206 may train a neural network using one frame of sensor data and associated ground truth at a time. In one embodiment, the training component 206 may train a plurality of different machine learning models to identify different aspects of virtual sensor data. For example, one model may be used to classify an object in a virtual sensor frame as a parking barrier, while another one or more other models may be used to determine a position, orientation, distance, and/or dimension of the parking barrier, object, or other obstacle.

The testing component 208 may test a machine learning algorithm or model using the virtual sensor data and virtual ground truth. For example, the testing component 208 may provide at least a portion of the virtual sensor data to the machine learning algorithm or model to determine one or more of a height and a position of the parking barrier, object, or other obstacle and compare a determined height or a determined position with the virtual ground truth. The testing component 208 may be able to accurately determine how well a model or algorithm performs because a determined classification or value may be compared with the virtual ground truth. If an algorithm or model is sufficiently accurate, it may be implemented as part of an automated driving/assistance system 102.

Figure 3:
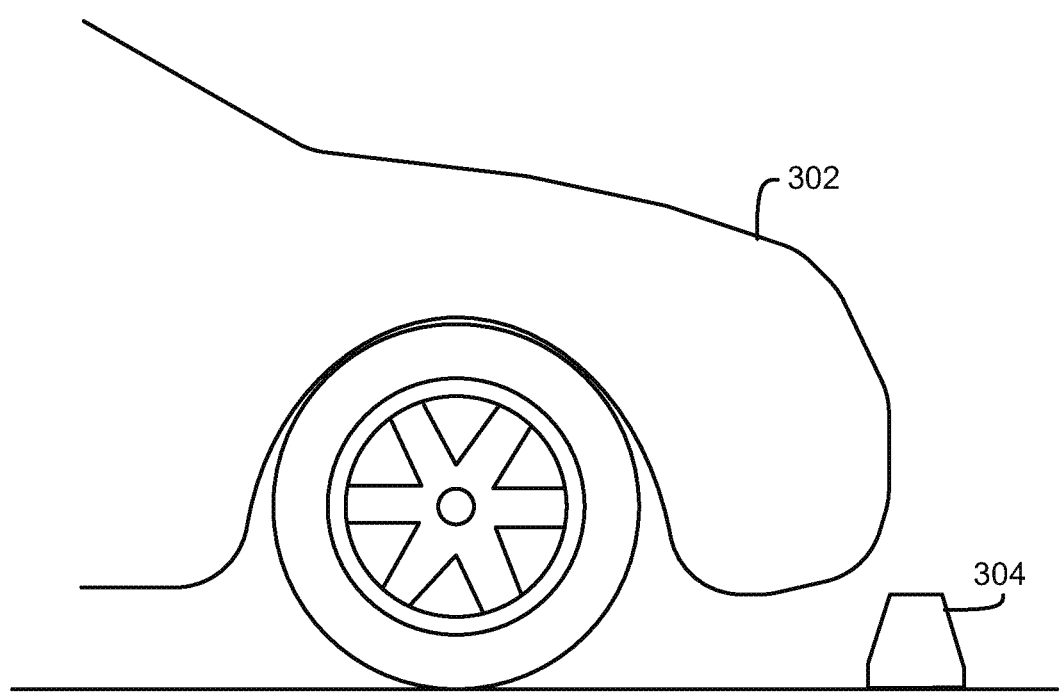
FIG. 3 is a schematic diagram illustrating a side view of a vehicle located near a parking chock.

FIG. 3 illustrates a side view of a vehicle 302 and a parking barrier 304. If the vehicle 302 does not stop short of the parking barrier 304, the parking barrier 304 may impact, scrape, or damage a bumper or other portion of the vehicle 302. As the vehicle moves closer in proximity, the parking barrier 304 may not be visible through a windshield of the vehicle 302 and one or more sensors mounted on or near the hood or roof of the vehicle 302 also may not be able to detect the parking barrier 304. Thus, it may be important to obtain an accurate height and location of the parking barrier 304, while the parking barrier is detectable so that contact between the vehicle 302 and the parking barrier 304 can be avoided when the vehicle is parked or otherwise driven near the parking barrier 304. Additionally, the location of the parking barrier 304 may be stored in memory so that when a driver returns or the vehicle 302 is restarted, the driver or automated driving/assistance system 102 can be reminded of the presence and location of the parking barrier 304.

Figure 4:
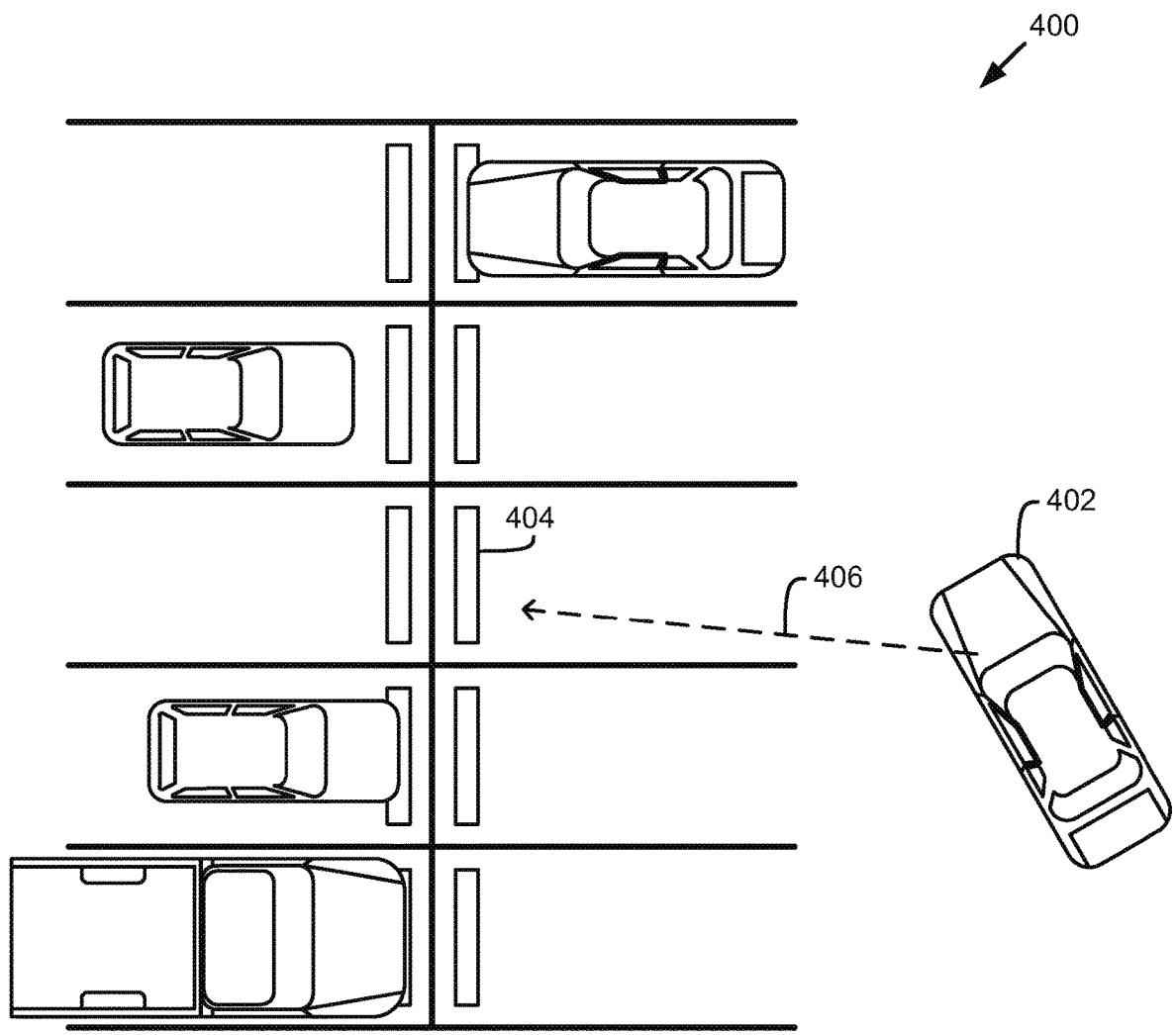
FIG. 4 is a schematic top view diagram illustrating a virtual parking lot environment, according to one embodiment.

FIG. 4 is a top view diagram of a virtual parking lot environment 400 with a plurality of parking locations and parking barriers 404. For example, the virtual parking lot environment 400 may be generated and simulated by the simulation component 202. Thus, the virtual parking lot environment 400, and all objects, may represent computer models or simulations that are generated by the simulation component 202. The virtual parking lot environment 400 may also include one or more lighting sources or other objects to simulate a real parking lot environment. For example, the lighting may simulate different times of day, various weather types, and/or lighting positions. One or more plants, curbs, or a surrounding environment for the virtual parking lot environment 400 may also be generated or simulated.

Within the virtual parking lot environment 400, a vehicle 402 is shown as it is approaching or pulling into a specific parking stall having a parking barrier 404. The parking barrier 404 includes a parking chock. Embodiments of parking chocks include concrete, rubber, or other barriers, which are placed at parking locations to prevent vehicles from pulling or rolling too far. The virtual parking lot environment 400 includes a parking barrier 404 for each parking stall. However, some parking lots may be inconsistent with inclusion of parking barriers so that a driver or system cannot assume that a specific parking stall does or does not include a parking barrier based on other parking stalls. According to one embodiment, as indicated by line 406, as the vehicle 402 pulls into the parking stall one or more sensors may obtain data (such as an image or frame) that includes a portion of the parking barrier 404. As discussed above, the simulation component 202 may generate a virtual frame of perception data that simulates what a sensor on the vehicle 402 would capture if the virtual parking lot environment 400 was a real-world environment.

In one embodiment, the vehicle 402 (with any associated virtual sensors) is moved along a path or randomly repositioned within the virtual parking lot environment 400 and additional frames of perception data may be generated. Similarly, information corresponding to the simulated conditions may be saved with the frames so that virtual ground truth is available for each frame. In one embodiment, positions of objects within the virtual parking lot environment 400 and one or more other conditions may be randomized for a plurality of different frames. For example, lighting, positions, weather conditions, or the like may be randomly generated, within acceptable bounds, to generate virtual sensor data for a wide array of different conditions.

Although FIG. 4 illustrates a plan view of a virtual parking lot environment 400, vehicles may be parked in a wide variety of locations where parking barriers 404 or parking chocks may be present. For example, road-side parking, driveway parking, or any other parking location may also include a parking barrier, parking chock, wheel stop, curb, or other object to define parking locations or parking stalls. Thus, any location where vehicles are driven or may be parked may be simulated in one or more other virtual environments.

Figure 5:
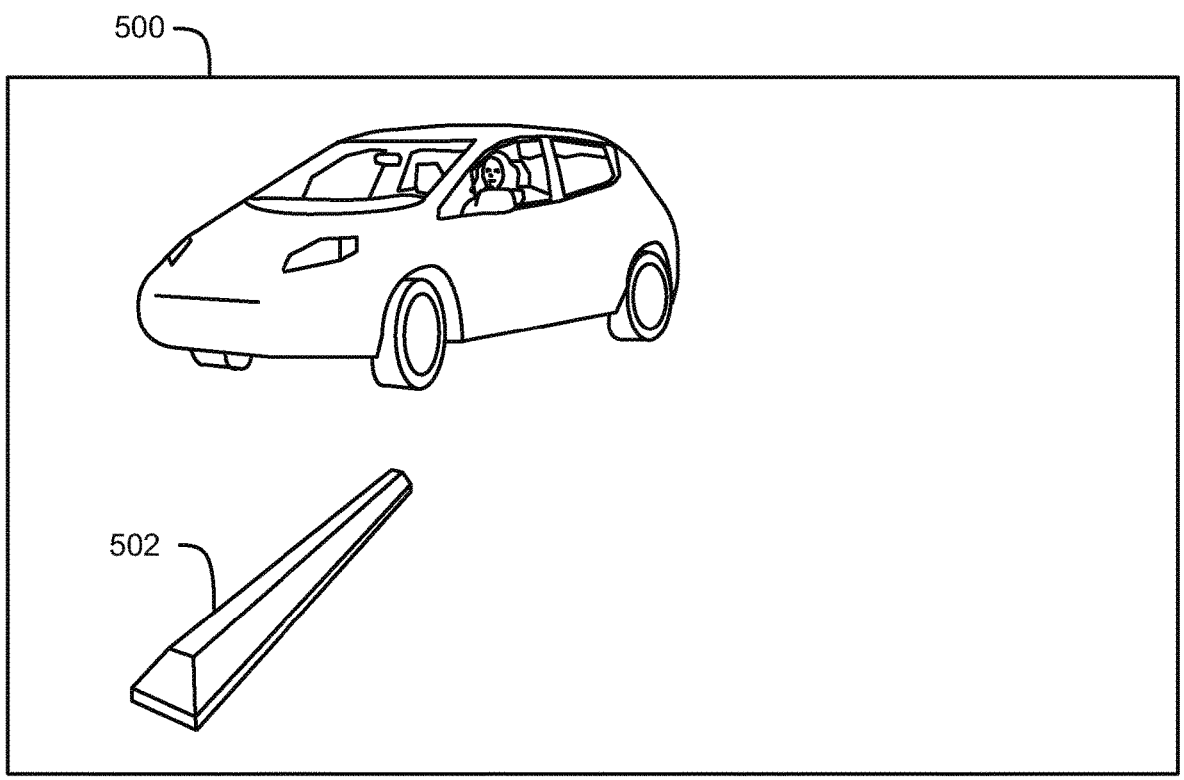
FIG. 5 is an example frame of sensor data.

FIG. 5 illustrates an example frame 500 of sensor data generated by a simulation component 202. For example, the frame 500 may include a virtual image captured by a virtual camera located at a simulated position within a virtual environment. The frame 500 includes a parking barrier 502 positioned within a virtual environment. The shape and position of the parking barrier 502 within the frame 500 may be a result of the current position and orientation of the parking barrier 502 as well as a virtual camera that has "captured" the frame 500. Virtual ground truth for the frame 500 may be saved with the frame 500 or may be associated with the frame 500 so that specific virtual conditions for the frame 500 are known. The virtual ground truth may include a distance (e.g., a simulated distance in feet, meters, or other measurement unit) between a sensor and the parking barrier 502, an orientation of the sensor, an orientation of the parking barrier 502, one or more dimensions of the parking barrier 502, a material of the parking barrier 502, specific positions of both the parking barrier 502 and a sensor that capture the frame 500, simulated weather conditions, simulated time of day, simulated lighting positions, simulated lighting colors, or any other additional information about a simulated environment in which the frame 500 was captured.

Figure 6:
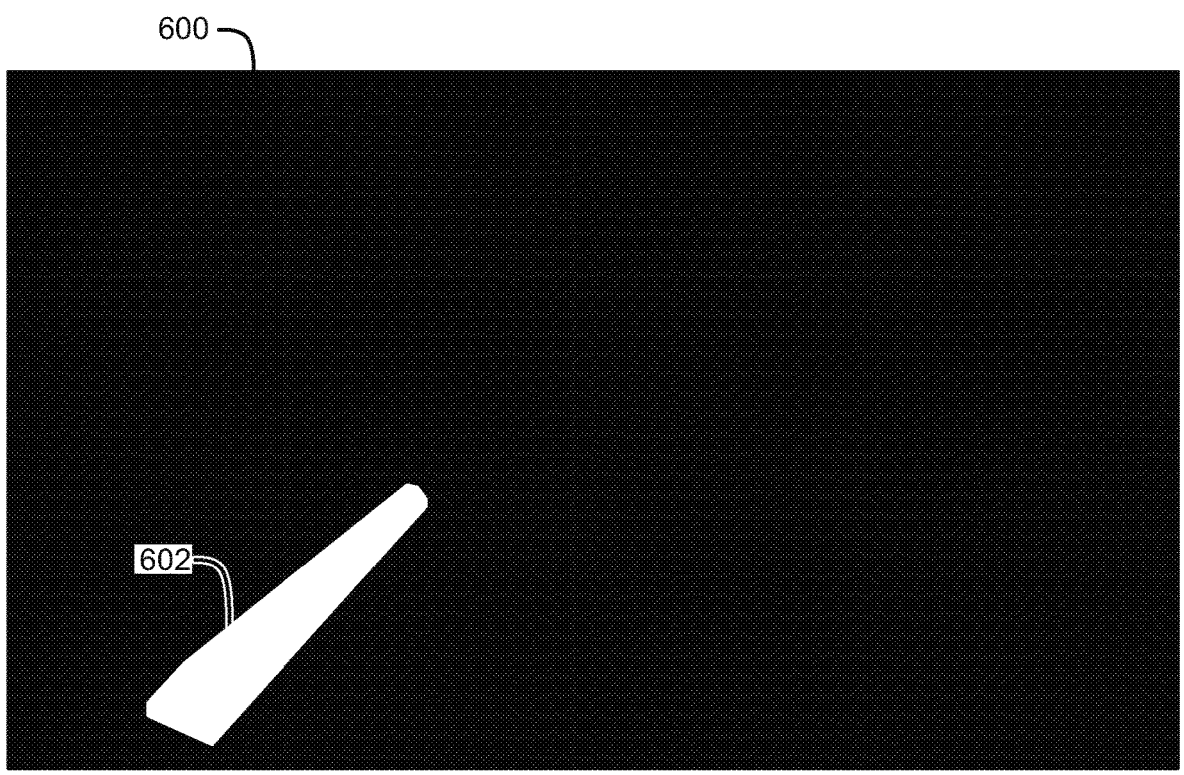
FIG. 6 is an example complimentary frame of the frame illustrated in FIG. 5, according to one implementation.

FIG. 6 illustrates one embodiment of a complimentary frame 600 corresponding to the frame 500 of FIG. 5. The complimentary frame includes a region 602 of a solid color that corresponds to a region of the frame 500 where the pixels of the parking barrier 502 are located. In FIG. 6, the region 602 is white, while the rest of the complimentary frame 600 is black. However, other embodiments may be similar to the original image with a solid color covering a region of the parking barrier 602. For example, a bright green color may be used for the region 602, while the black portion of the complimentary frame 600 may not be black, but may be identical to the corresponding regions/pixels of the original frame 500. In one embodiment, the complimentary frame 600 may be included in ground truth information for the frame 500 so that an algorithm may be trained or tested. For example, the complementary frame 600 may be provided with the frame 500 for training of a neural network that is used to detect and/or identify dimensions of a parking barrier.

Although FIG. 5 and FIG. 6 are discussed above in relation to camera images, other types of sensor data frames are contemplated and fall within the scope of the present disclosure. For example, LIDAR frames, radar frames, ultrasound frames, or any other type of sensor data frame may be generated and stored within any simulated ground truth. Additionally, although some embodiments and examples provided herein include the simulation and modeling of parking barriers, any other type of object or data may be used. For example, virtual sensor data for any type of object that may be encountered in a driving environment may be generated. Example objects or obstacles may include parking barriers or curbs, other vehicles, road or lane lines, parking lines, road signs, pedestrians, cyclists, animals, road debris, bumps or dips in a road, or any other object, obstacle or feature, which may alter how a vehicle should operate or alter a path of a vehicle.

Figure 7:
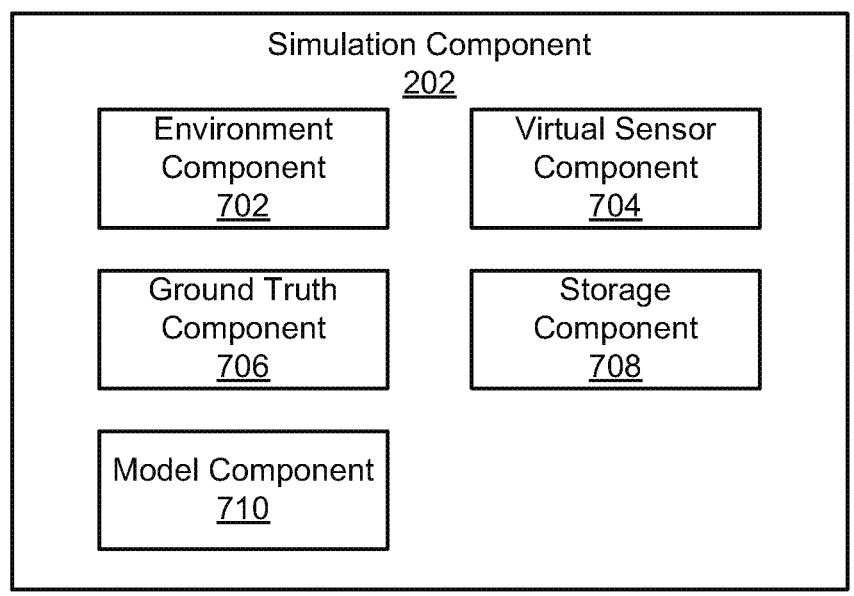
FIG. 7 is a schematic block diagram illustrating example components of a simulation component, according to one implementation.

FIG. 7 is a block diagram illustrating example components of a simulation component 202. In the depicted embodiment, the simulation component 202 includes an environment component 702, a virtual sensor component 704, a ground truth component 706, a storage component 708, and a model component 710. The components 702-710 are given by way of illustration only and may not all be included in all embodiments. In fact, some embodiments may include only one or any combination of two or more of the components 702-710. Some of the components 702-710 may be located outside the simulation component 202.

The environment component 702 is configured to generate and/or simulate a virtual environment. In one embodiment, the environment component 702 simulates or generates a 3D parking or driving environment. The environment component 702 may use a 3D gaming or simulation engine for creating, simulating, and/or rendering an environment where a vehicle may be driven or parked. For example, gaming engines used for driving games or any other game design may be used for purposes of simulating a real-world environment.

In one embodiment, the environment component 702 simulates an environment with a plurality of virtual objects. The virtual objects may include parking barriers, vehicles, trees, plants, curbs, painted lines, buildings, landscapes, pedestrians, animals, or any other objects that may be found in a driving or parking environment. The environment component 702 may simulate crowded conditions where there are a large number of vehicles, pedestrians, or other objects. The environment component 702 may also simulate lighting conditions. For example, the environment component 702 may simulate a light source including a sun, moon light, street lights, building lights, vehicle headlights, vehicle brake lights, or any other light source. The environment component 702 may also simulate shadows, lighting colors for the sun or moon at different times of the day, or weather conditions. For example, the environment component 702 may simulate lighting for cloudy, rainy, snowy, and other weather conditions. Additionally, the environment component 702 may simulate wet or snow conditions where roads, parking lots, and objects in a virtual environment are wet or covered with snow.

In one embodiment, the environment component 702 may randomize simulated conditions. For example, the environment component 702 may periodically randomize one or more simulated conditions to generate environments having a wide array of conditions. In one embodiment, the environment component 702 may randomly generate different conditions for one or more of lighting, weather, a position of the one or more virtual parking barriers or other objects, and dimensions of the one or more virtual parking barriers or other objects.

In one embodiment, the environment component 702 may simulate a position of a sensor within the virtual environment. The environment component 702 may simulate movement of one or more sensors along a path within the virtual environment or may randomize sensor positioning. For example, the environment component 702 may simulate a position and/or orientation of a sensor based on a planned location on a vehicle. In one embodiment, the environment component 702 may randomize a position, height, orientation, or other positioning aspects of a sensor within the virtual environment. The randomized locations for the sensor, or other simulated conditions for the virtual environment may be randomized within predefined bounds to increase likelihood that the virtual environment is similar to conditions that would be encountered by vehicles in real-world situations.

The virtual sensor component 704 is configured to generate sensor data or perception data for a virtual sensor within a virtual environment generated or simulated by the environment component 702. In one embodiment, the virtual sensor component 704 may include or use a model of real-world performance of one or more specific sensors that are to be used by a vehicle. For example, a sensor may have a virtual model that simulates the real-world performance of the sensor. The virtual sensor component 704 may simulate how a sensor generates a frame. The virtual sensor component 704 may generate virtual sensor data that includes one or more of computer generated images, computer generated radar data, computer generated LIDAR data, computer generated ultrasound data, or other data for other types of perception sensors.

In one embodiment, the virtual sensor component 704 is configured to generate sensor frames or sensor data on a periodic basis. For example, the virtual sensor component 704 may generate an image (or other sensor) at a simulated interval similar to frequently a camera captures an image. In one embodiment, the virtual sensor component 704 creates sensor data for each position simulated by the environment component 702. For example, the virtual sensor component 704 may generate sensor data for positions along a path traveled by a virtual vehicle within a virtual environment. In one embodiment, one or more of the images or frames of sensor data include a portion of a virtual parking barrier or other object. For example, computer generated images of parking barriers or other objects in a virtual environment may be produced by the virtual sensor component 704.

The ground truth component 706 is configured to generate virtual ground truth for the virtual sensor data generated by the virtual sensor component 704. For example, the ground truth component 706 may determine simulated conditions for each image or frame captured by the virtual sensor component 704. In one embodiment, the environment component 702 may provide the simulated conditions to the ground truth component 706. The ground truth component 706 may select one or more simulated conditions as ground truth or calculate ground truth based on the simulated conditions for specific virtual sensor data. For example, the ground truth component 706 may select a dimension of a parking barrier (such as height) as ground truth for a computer generated image or frame. As another example, the ground truth component 706 may receive virtual positions of a parking barrier and a sensor and then calculate a virtual distance (e.g., line of sight distance and/or horizontal distance) between the virtual sensor and the parking barrier. Similar information about other objects or obstacles within the virtual environment is also contemplated.

The virtual ground truth may include information about a position and orientation of a sensor, a position and orientation of a parking barrier or other object, one or more dimensions of a parking barrier or other object, lighting conditions, weather conditions, a distance between the sensor and the parking barrier or other object, a type of sensor used to capture sensor data, or any other information about simulation conditions. In one embodiment, a uniform set of ground truth may be determined for each frame or set of sensor data generated by the virtual sensor component 704. For example, the same ground truth information (e.g., sensor height, distance, etc.) for each position where virtual sensor data was generated may be computed.

In one embodiment, the ground truth component 706 may generate a complementary frame for a frame of sensor data generated by the virtual sensor component 704 (see FIG. 6). For example, the complementary frame may have the same color value for pixels corresponding to the one or more virtual parking barriers. For example, each pixel corresponding to a virtual parking barrier may have the same color so that a training algorithm or a testing algorithm can clearly determine what portion of virtual sensor data corresponds to a virtual parking barrier. In one embodiment, each pixel of the complementary frame may include an image pixel, radar or LIDAR vector, or other pixel or matrix value of virtual sensor data.

The storage component 708 is configured to store the virtual sensor data generated by the virtual sensor component 704 and/or any ground truth determined by the ground truth component 706. For example, the storage component 708 may store the virtual sensor data and/or ground truth in the storage 204 of FIG. 2. In one embodiment, the storage component 708 may associate or annotate the virtual sensor data with corresponding ground truth or other information about simulated conditions. The sensor data and ground truth may then be used for a wide variety of purposes, such as for training a machine learning algorithm or model or for testing a machine learning algorithm or model.

The model component 710 is configured to provide the virtual sensor data and/or ground truth to an algorithm for testing or training of a machine learning algorithm or model. For example, the model component 710 may provide the virtual sensor data and/or the ground truth provided by the virtual sensor component t704 and/or ground truth component 706 to the training component 206 or testing component 208 of FIG. 2. In another embodiment, the model component 710 may include the training component 206 and/or the testing component 208. For example, the virtual sensor data and/or virtual ground truth may be used to train or test a neural network, deep neural network, and/or convolution neural network for detecting, identifying, determining one or more properties of a parking barrier or other object. For example, the machine learning algorithm or model may be trained or tested for inclusion in the automated driving/assistance system 102 of FIG. 1.

Figure 8:
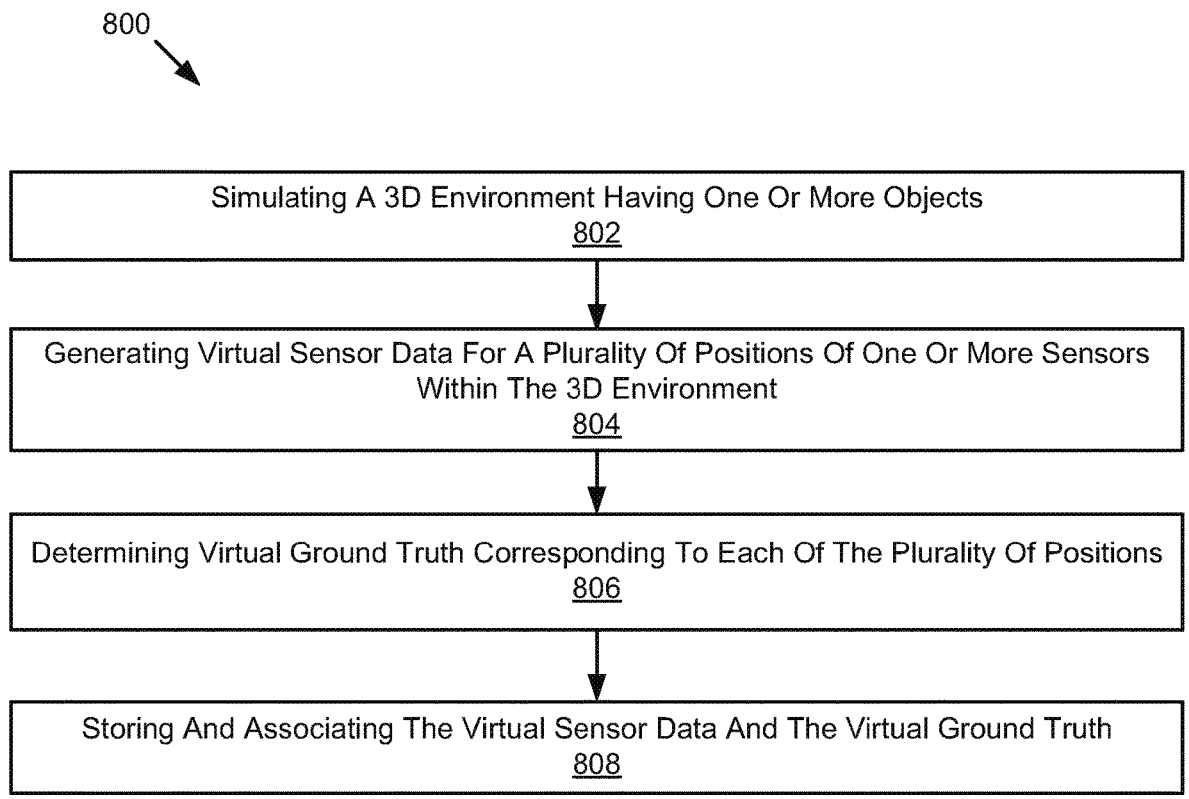
FIG. 8 is a schematic flow chart diagram illustrating a method for generating virtual sensor data, according to one implementation.

Referring now to FIG. 8, a schematic flow chart diagram of a method 800 for generating virtual sensor data and ground truth is illustrated. The method 800 may be performed by simulation component or a system for sensor data generation, such as the simulation component 202 of FIG. 2 or 7 or the system 200 for sensor data generation of FIG. 2.

The method 800 begins and an environment component 702 simulates a three-dimensional (3D) environment comprising one or more parking barriers or other objects at 802. A virtual sensor component 704 generates virtual sensor data for a plurality of positions of one or more sensors within the 3D environment at 804. A ground truth component 706 determines virtual ground truth corresponding to each of the plurality of positions at 806. The ground truth may include information about at least one object within the virtual sensor data, such as an object with one or more features captured in an image or other sensor data. The information may include any information about the objects discussed herein, such as dimensions, position, or orientations of objects. For example, the ground truth may include a height of the at least one of the parking barriers or other objects. A storage component 708 stores and associates the virtual sensor data and the virtual ground truth at 808. The method may also include a model component 710 providing a the virtual sensor data and/or virtual ground truth to a training component 206 or a testing component 208 of FIG. 2 for training or testing of a machine learning algorithm or model. After training and/or testing a model, such as a deep neural network, the model may be included in the vehicle control system 100 of FIG. 1 for active object or parking barrier detection and dimension estimation during real-world driving conditions.

EXAMPLES

The following examples pertain to further embodiments.

Example 1 is a method that includes simulating a 3D environment that includes one or more objects, such as parking barriers. The method includes generating virtual sensor data for a plurality of positions of one or more sensors within the 3D environment. The method includes determining virtual ground truth corresponding to each of the plurality of positions. The ground truth includes information about at least one object within the sensor data. For example, the ground truth may include a height of the at least one of the parking barriers. The method also includes storing and associating the virtual sensor data and the virtual ground truth.

In Example 2, the method of Example 1 further includes providing one or more of the virtual sensor data and the virtual ground truth for training or testing of a machine learning algorithm or model.

In Example 3, the machine learning model or algorithm in Example 2 includes a neural network.

In Example 4, training the machine learning algorithm or model in any of Examples 2-3 includes providing at least a portion of the virtual sensor data and corresponding virtual ground truth to train the machine learning algorithm or model to determine one or more of a height and a position of one or more parking barriers or other objects.

In Example 5, testing the machine learning algorithm or model in any of Examples 2-4 includes providing at least a portion of the virtual sensor data to the machine learning algorithm or model to determine a classification or a position of at least one object and compare the classification or the position with the virtual ground truth.

In Example 6, the plurality of positions in any of Examples 1-5 correspond to planned locations of sensors on a vehicle.

In Example 7, the virtual sensor data in any of Examples 1-6 includes one or more of computer generated images, computer generated radar data, computer generated LIDAR data, and computer generated ultrasound data.

In Example 8, simulating the 3D environment in any of Examples 1-7 includes randomly generating different conditions for one or more of lighting, weather, a position of the one or more objects, and a classification or type of the one or more objects.

In Example 9, generating the virtual sensor data in any of Examples 1-8 includes periodically generating the virtual sensor data during simulated movement of the one or more sensors within the 3D environment.

In Example 10, determining the virtual ground truth in any of Examples 1-9 includes generating a ground truth frame complimentary to a frame of virtual sensor data, wherein the ground truth frame includes a same color value for pixels corresponding to the one or more objects.

Example 11 is a system that includes an environment component, a virtual sensor component, a ground truth component, and a model component. The environment component is configured to simulate a 3D environment comprising one or more virtual objects or obstacles. The virtual sensor component is configured to generate virtual sensor data for a plurality of positions of one or more sensors within the 3D environment. The ground truth component is configured to determine virtual ground truth corresponding to each of the plurality of positions, wherein the ground truth includes information about at least one obstacle of the one or more obstacles. The model component is configured to provide the virtual perception data and the ground truth to a machine learning algorithm or model to train or test the machine learning algorithm or model.

In Example 12, the model component in Example 11 is configured to train the machine learning algorithm or model, wherein training includes providing at least a portion of the virtual sensor data and corresponding virtual ground truth to train the machine learning algorithm or model to determine a classification or position of the at least one obstacle.

In Example 13, the model component in any of Examples 11-12 is configured to test the machine learning algorithm or model. The testing includes providing at least a portion of the virtual sensor data to the machine learning algorithm or model to determine a classification or position of the at least one obstacle or object and comparing the classification or the position with the virtual ground truth.

In Example 14, the virtual sensor component in any of Examples 11-13 is configured to generate virtual sensor data comprising one or more of computer generated images, computer generated radar data, computer generated LIDAR data, and computer generated ultrasound data.

In Example 15, the environment component in any of Examples 11-14 is configured to simulate the 3D environment by randomly generating different conditions for one or more of the plurality of positions, wherein the different conditions comprise one or more of: lighting conditions; weather conditions; a position of the one or more obstacles or objects; and dimensions of the one or more obstacles or objects.

Example 16 is a computer readable storage media storing instructions that, when executed by one or more processors, cause the one or more processors to generate virtual sensor data for a plurality of sensor positions within a simulated 3D environment comprising one or more virtual objects. The instructions cause the one or more processors to determine one or more simulated conditions for each of the plurality of positions, wherein the simulated conditions comprise one or more of classification, a position, and a dimension of at least one object of the one or more objects. The instructions cause the one or more processors to store and annotate the virtual sensor data with the simulated conditions.

In Example 17, the instructions in Example 16 further cause the one or more processors to train or test a machine learning algorithm or model based on one or more of the virtual sensor data and the simulated conditions.

In Example 18, the instructions in any of Examples 16-17 further cause the processor to one or more of: train the machine learning algorithm or model by providing at least a portion of the virtual sensor data and corresponding simulated conditions to train the machine learning algorithm or model to determine one or more of a classification, a position, and a dimension of the at least one object; and test the machine learning algorithm or model by providing at least a portion of the virtual sensor data to the machine learning algorithm or model to determine one or more of a classification, a position, and a dimension of the at least one object and by comparing a determined classification, a position, and a dimension of the at least one object with the simulated conditions.

In Example 19, generating the virtual sensor data in any of Examples 16-18 includes simulating the 3D environment by randomizing one or more of the simulated conditions for one or more of the plurality of positions, wherein randomizing the one or more simulated conditions comprises randomizing one or more of: lighting conditions; weather conditions; a position of the one or more virtual objects; and dimensions of the one or more virtual objects.

In Example 20, determining the simulated conditions in any of Examples 16-19 further includes generating a ground truth frame complimentary to a frame of virtual sensor data, wherein the ground truth frame comprises a same color value for pixels corresponding to the at least one object.

Example 21 is a system or device that includes means for implementing a method or realizing a system or apparatus as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A computer implemented method comprising:
simulating a three-dimensional (3D) environment comprising a plurality of static virtual objects and a driving surface;
randomizing dimensions and positions of the plurality of static virtual objects within the 3D environment;
simulating a sensor traveling the 3D environment, wherein the sensor is positioned relative to the driving surface according to a planned position of the sensor on a vehicle;
recording virtual sensor data captured by the sensor as the sensor travels the 3D environment; and
annotating the virtual sensor data with ground truth about the dimensions and the positions of the static virtual objects that are present in the virtual sensor data.

2. The method of claim 1, further comprising generating a dataset comprising annotated virtual sensor data for training or testing a machine learning algorithm or model.

3. The method of claim 2, further comprising generating a plurality of datasets having a plurality of randomized environmental conditions across a plurality of 3D environments.

4. The method of claim 2, further comprising training the machine learning algorithm or model by providing at least a portion of the virtual sensor data and corresponding ground truth to train the machine learning algorithm or model to determine one or more of a dimension or position of a static virtual object.

5. The method of claim 2, further comprising testing the machine learning algorithm or model by providing at least a portion of the virtual sensor data to the machine learning algorithm or model to determine one or more of a dimension or position of a static virtual object and compare a determined dimension or a determined position with the ground truth corresponding to the virtual sensor data.

6. The method of claim 1, wherein the plurality of static virtual objects are parking barriers and the driving surface is a parking lot surface.

7. The method of claim 1, wherein the virtual sensor data comprises one or more of computer generated images, computer generated radar data, computer generated LIDAR data, and computer generated ultrasound data.

8. The method of claim 1, further comprising randomizing a lighting condition for the plurality of static virtual objects within the 3D environment.

9. The method of claim 1, wherein the virtual sensor data comprises computer generated images and the method further comprises generating a complimentary image frame of pixelwise segmented image data such that all pixels belonging to a static virtual object are a solid color with a constant color value.

10. The method of claim 1, further comprising generating complimentary sensor data corresponding to the virtual sensor data, wherein a static virtual object captured in the complimentary sensor data is depicted with a constant color value.

11. A system comprising:
a processor that is programmable to execute instructions stored in non-transitory computer readable storage media, the instructions comprising:
simulating a three-dimensional (3D) environment comprising a plurality of virtual parking barriers and a driving surface;
randomizing dimensions and positions of the plurality of virtual parking barriers within the 3D environment;
simulating a sensor traveling the 3D environment, wherein the sensor is positioned relative to the driving surface according to a planned position of the sensor on a vehicle;
recording virtual sensor data captured by the sensor as the sensor travels the 3D environment; and
annotating the virtual sensor data with ground truth about the dimensions and the positions of the virtual parking barriers that are present in the virtual sensor data.

12. The system of claim 11, wherein the instructions further comprise generating a dataset comprising annotated virtual sensor data for training or testing a machine learning algorithm or model.

13. The system of claim 12, wherein the instructions further comprise testing the machine learning algorithm or model by:
providing at least a portion of the virtual sensor data to the machine learning algorithm or model to determine one or more of a dimension or a position of a virtual parking barrier; and
comparing a determined dimension or a determined position with the ground truth.

14. The system of claim 11, wherein the virtual sensor data comprises one or more of computer generated images, computer generated radar data, computer generated light detection and ranging (LIDAR) data, and computer generated ultrasound data.

15. The system of claim 11, wherein the instructions further comprise randomizing a lighting condition for the plurality of virtual parking barriers within the 3D environment.

16. Non-transitory computer readable storage media storing instructions to be executed by one or more processors, the instructions comprising:
simulating a three-dimensional (3D) environment comprising a plurality of virtual parking barriers and a driving surface;
randomizing dimensions and positions of the plurality of virtual parking barriers within the 3D environment;
simulating a sensor traveling the 3D environment, wherein the sensor is positioned relative to the driving surface according to a planned position of the sensor on a vehicle;
recording virtual sensor data captured by the sensor as the sensor travels the 3D environment; and
annotating the virtual sensor data with ground truth about the dimensions and the positions of the virtual parking barriers that are present in the virtual sensor data.

17. The non-transitory computer readable storage of claim 16, wherein the instructions further comprise generating a dataset comprising annotated virtual sensor data for training or testing a machine learning algorithm or model.

18. The non-transitory computer readable storage of claim 17, wherein one or more of:
the instructions further comprising training the machine learning algorithm or model by providing at least a portion of the virtual sensor data and corresponding ground truth to train the machine learning algorithm or model to determine one or more of a dimension or a position of the one or more virtual parking barriers; and the instructions further comprise testing the machine learning algorithm or model by providing at least a portion of the virtual sensor data to the machine learning algorithm or model to determine one or more of a dimension or a position of the one or more virtual parking barriers and by comparing a determined dimension or a determined position with the ground truth.

19. The non-transitory computer readable storage of claim 16, wherein the instructions further comprise randomizing a lighting condition for the plurality of virtual parking barriers within the 3D environment.

20. The non-transitory computer readable storage of claim 16, wherein the virtual sensor data comprises computer generated images and the instructions further comprise generating a complimentary image frame of pixelwise segmented image data such that all pixels belonging to a virtual parking barrier captured in the complimentary image frame are a solid color with a constant color value.

\* \* \* \* \*